United States Patent [19]

Fukuzawa et al.

[11] Patent Number: 4,980,816
[45] Date of Patent: Dec. 25, 1990

[54] TRANSLATION LOOK-ASIDE BUFFER CONTROL SYSTEM WITH MULTIPLE PRIORITIZED BUFFERS

[75] Inventors: Hajime Fukuzawa; Kozo Yamano; Yasuyuki Iwata; Fumihiko Miyazawa, all of Tokyo, Japan

[73] Assignee: NEC Corporation, Tokyo, Japan

[21] Appl. No.: 285,622

[22] Filed: Dec. 16, 1988

[30] Foreign Application Priority Data

| Dec. 18, 1987 | [JP] | Japan | 62-319018 |
| Dec. 18, 1987 | [JP] | Japan | 62-319019 |
| Dec. 18, 1987 | [JP] | Japan | 62-319020 |
| Dec. 18, 1987 | [JP] | Japan | 62-319023 |
| Dec. 18, 1987 | [JP] | Japan | 62-319024 |

[51] Int. Cl.$^5$ .............................................. G06F 1/00
[52] U.S. Cl. ..................... 364/200; 364/239; 364/239.4
[58] Field of Search ........................ 364/200, 300, 900

[56] References Cited

U.S. PATENT DOCUMENTS

| 3,786,427 | 1/1974 | Schmidt et al. | 364/200 |
| 4,589,092 | 5/1986 | Matick | 364/900 |
| 4,638,426 | 1/1987 | Chang et al. | 364/200 |
| 4,719,568 | 1/1988 | Carrubba et al. | 364/200 |
| 4,774,653 | 9/1988 | James | 364/200 |

Primary Examiner—Raulfe B. Zache
Attorney, Agent, or Firm—Foley & Lardner, Schwartz, Jeffery, Schwaab, Mack, Blumenthal & Evans

[57] ABSTRACT

An address translation buffer control system includes multiple prioritized address translation buffers and circuitry for changing the contents of the buffers. When a desired address translation pair is not present in the buffer having the highest priority, the contents of the highest priority buffer are replaced with contents from a lower priority buffer. If a desired address translation pair is not present in any buffer, the contents of the lowest priority buffer are replaced.

2 Claims, 6 Drawing Sheets

| SWPL | | | TLB | | | |
|---|---|---|---|---|---|---|
| | | | 140 | 141 | 142 | 143 |
| 209 | 210 | 211 | WE130 | WE131 | WE132 | WE133 |
| 1 | 0 | 0 | TLB141 | TLB140 | NO UPDATE | NO UPDATE |
| | | | 1 | 1 | 0 | 0 |
| 0 | 1 | 0 | TLB142 | TLB140 | TLB141 | NO UPDATE |
| | | | 1 | 1 | 1 | 0 |
| 0 | 0 | 1 | TLB143 | TLB140 | TLB141 | TLB142 |
| | | | 1 | 1 | 1 | 1 |
| 0 | 0 | 0 | A PAIR OF ADDRESSES FOR TRANSLATION | TLB140 | TLB141 | TLB142 |
| | | | 1 | 1 | 1 | 1 |

FIG. 6

TRANSLATION LOOK-ASIDE BUFFER CONTROL SYSTEM WITH MULTIPLE PRIORITIZED BUFFERS

BACKGROUND OF THE INVENTION

The present invention relates to a translation look-aside buffer (TLB) control system.

Prior Art and Its Disadvantages

A virtual memory unit used in a virtual addressing system can have a greater memory capacity than, usually several times as great as, that of the actual main memory unit.

To make possible virtual addressing, the virtual memory unit is divided into a plurality of segments, each of which is further subdivided into a plurality of pages, each comprising a prescribed number of bytes.

These pages are allocated for different locations in the whole main memory unit, and for this reason there are prepared page tables reflecting the actual location of each page. This means that one page table reflects the actual locations of all the pages in a specific segment. Accordingly, another page table reflects the actual locations of all the pages pertaining to another segment of the virtual memory unit.

As these page tables are also allocated at random for different segments of the whole main memory unit, there are prepared segment tables reflecting the actual location of each page table.

The segment tables and page tables are retained in the main memory unit, and used for translating a logical address (which may as well be referred to as a virtual address) into a real address, i.e. the actual location of the required page in the main memory unit. Address translation is a process to translate a logical address into an address on the actual main memory unit.

The usual format of a logical address is one of division into three fields represented as the segment number, the page number and the in-page line address. The segment number serves as an index to an entry in the segment table. The segment table entry has a value representing the base address of the page table associated with the segment designated by the segment field. The page number serves as an index to an entry in the page table. The page table entry has a value representing the real address of the page. The in-page line address undergoes no change during address translation and, combined with the page address into which it has been translated, constitues a real address, i.e. an address in the actual main memory unit.

Address translation by referencing these tables is extremely slow, requiring several main memory cycles each time.

For this reason, it is common practice to use, in order to avoid repeating this address translation processing every time the memory unit is searched, a translation look-aside buffer (TLB; also known as an address translation buffer, abbreviated to ATB) in which a plurality of address translation pairs are held, the pairs consisting of the logical addresses most recently referenced and the corresponding real page addresses. This TLB consists of a very fast memory unit, and its use makes it possible to complete an address translation process in a single machine cycle.

Ultra-large computer systems for use in today's huge arrangements require ever greater memory capacities, which keep on increasing for both virtual and main memory units. Virtual memory units are required to have memory capacities on the order of gigabytes (for logical addresses of 30 bits and more) to terabytes (for logical addresses of 40 bits or more). For translation of logical addresses by which to search such a huge virtual memory unit, address translation by three-level look-up or even four-level look-up is contemplated instead of the conventional two-level look-up to segment tables and page tables, resulting in further increasing importance of TLB technology While the recent progress of LSI technology is significantly decreasing delays due to gate arrays and thereby acceleratedly reducing the machine cycles of ultra-large computers, delays attributable to RAMs constituting memory units, such as those constituting TLB's, or wiring to connect LSI's are more difficult to reduce than gate array-induced delays, so that the machine cycles of the system are determined by delays around these memory units, which constitute a bottle-neck in this respect. Another problem is posed by the expansion of the TLB's themselves invited by the increase of logical addresses, which in turn reflects the increased capacities of virtual memory units.

A TLB may be constituted either fully associatively or set-associatively, the latter using part of the logical address section for referencing.

The U.S. Pat. No. 3,786,427 discloses an example of fully associatively constituted TLB. In such a fully associative TLB (also known as a content addressed memory or CAM), a logical page address to be translated should be compared with every logical page stored in the CAM, so that as many comparators are required as the logical pages stored therein, resulting in the disadvantage of difficulty to expand the CAM capacity. There is another disadvantage that delays in the real address decision path cannot be readily reduced because only one has to be determined out of many real addresses. For this reason, it is usual for more recent supercomputers to use set-associative TLB's.

U.S. Pat. Nos. 4,589,092, 4,638,426 and 4,719,568 disclose examples of this set-associative TLB. Each of these TLB arrangements uses two sets of TLB's (also known as two-way TLB's) to improve its hitting rate, and determines only one real address from one or the other of the two sets. The method used with two-way TLB's is to read out a key address section, which is a part of a logical address registered in each TLB, compare it with the key address section of the logical address whose translation is requested, select and determine the real address directly read out of each TLB, together with the key address, according to the result of comparison. This method of real address determination uses the output of a TLB consisting of a memory unit which is far slower than a gate array, and further requires going through a comparator to generate a real address determination signal. Moreover, as a real address for searching a cache memory has to be selected and determined, this real address determination signal should travel from one LSI to another, there is still another great disadvantage of making it difficult to reduce the machine cycles of an ultra-large computer operating at ultra-high speed machine cycles.

Furthermore, when expanding the TLB's to cope with the increase of logical addresses invited by the expansion of the virtual memory unit, the memory unit is inevitably made slower and the TLB expansion is consequently made more difficult. This at the same time makes it difficult to increase the number (of ways of) TLB's.

In these cases where a plurality of TLB's are used, as disclosed in the aforementioned U.S. Pat. Nos. 4,638,426 and 4,719,568, there is yet another disadvantage of enlarged hardware because, in the absence of the demanded address translation pair, TLB replacement requires the use of hardware employing the least recently used (LRU) algorithm to determine the TLB entry which has remained unused for the longest period.

SUMMARY OF THE INVENTION

According to a first aspect of the present invention, there is provided a first system equipped with N (an integer not smaller than 2) address translation buffers each storing a plurality of address translation pairs, each pair comprising a logical address and a corresponding real address, wherein each of the N address translation buffers is individually assigned one of the first to the Nth ranks of priority for each instruction address referencing and one of the first to the Nth ranks of priority for each operand address referencing, and which includes referencing means for simultaneous searching by logical addresses, and replacing means for replacing, when the absence of the desired address translation pair in such one of the address translation buffers as has the first rank of priority has been determined by searching with the referencing means, an address translation pair in the address translation buffer having the first rank of priority with another address translation pair present in another address translation buffer than that having the first rank of priority.

According to a second aspect of the present invention, there is provided a second system equipped with address translation buffers to which the first to the Nth (N is an integer not smaller than 2) ranks of priority are assigned and each of which stores a plurality of address translation pairs, each pair comprising a logical address and a corresponding real address, including referencing means for searching the address buffers having the first to the Nth ranks of priority by logical addresses, and replacing means for replacing, when the absence of the desired address translation pair in such one of the address translation buffers as has the first rank of priority and the presence of the desired address translation pair in another of the address translation buffers as has any other rank of priority than the first have been determined by searching with the referencing means, every address translation buffer having one rank of priority or another between said first address translation buffer to the address translation buffer in which the address translation pair is present in accordance with the ranks of priority in order to replace an address translation pair in the address translation buffer having the first rank of priority with such address translation pair present in the other address translation buffer, and substituting, when the absence of the desired address translation pair in any of the address translation buffers has been determined by searching with the referencing means, an address translation pair in the address translation buffer having the lowest rank of priority.

BRIEF DESCRIPTION OF THE DRAWINGS

These and other features, constitutions and advantages of the present invention will become apparent from the detailed description hereunder when taken in conjunction with the accompanying drawings, in which:

FIG. 3 illustrates the constitution of the cache control circuit 400 in FIG. 1A; and FIGS. 4 to 6 are diagrams for describing the operation of the preferred embodiment of the invention.

In the figures, the same reference numerals denote the same structural elements respectively.

DETAILED DESCRIPTION OF THE PREFERRED EMBODIMENT

Figure 1A:
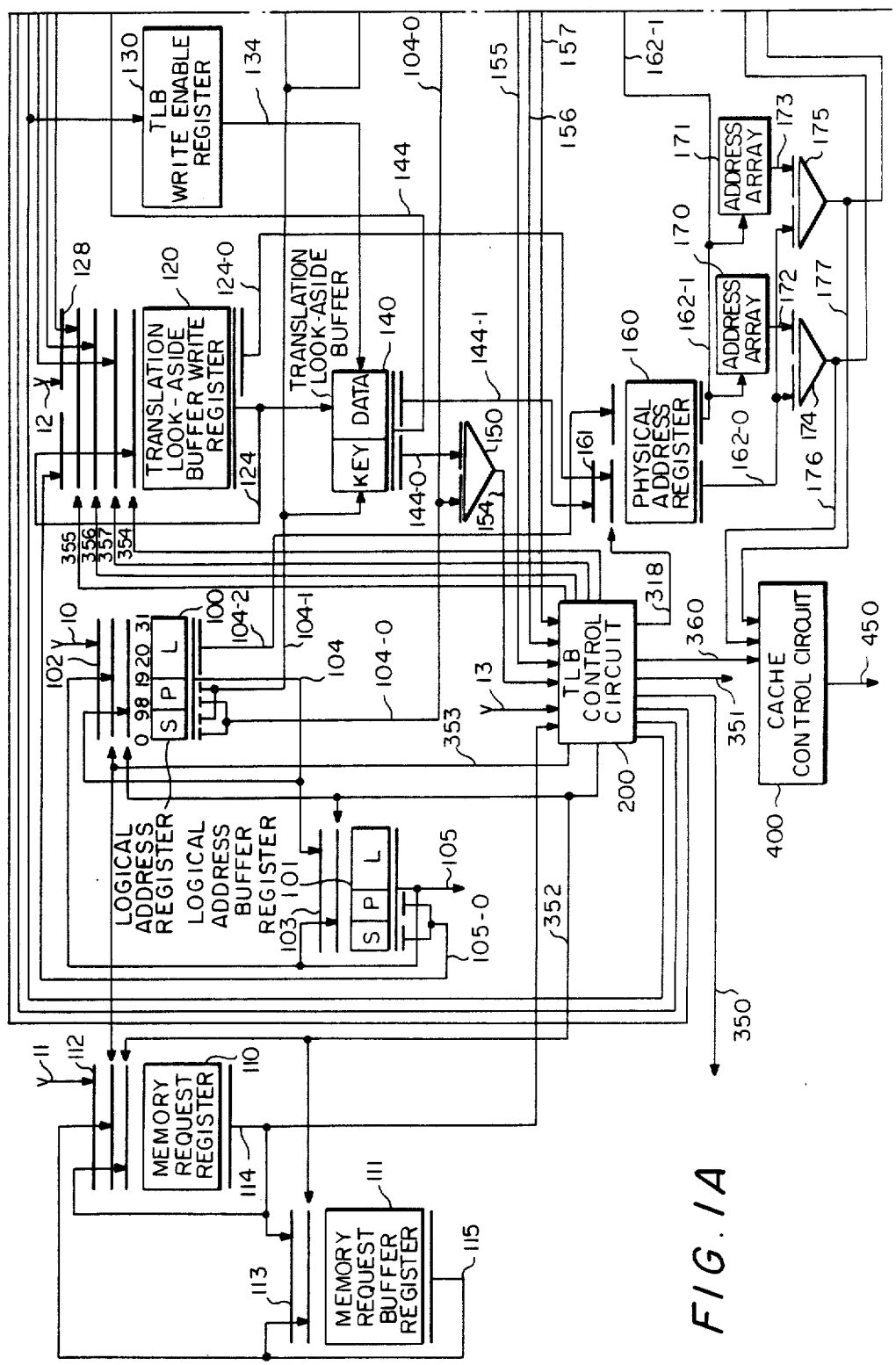
FIGS. 1A and 1B illustrate a preferred embodiment of the invention.
Figure 1B:
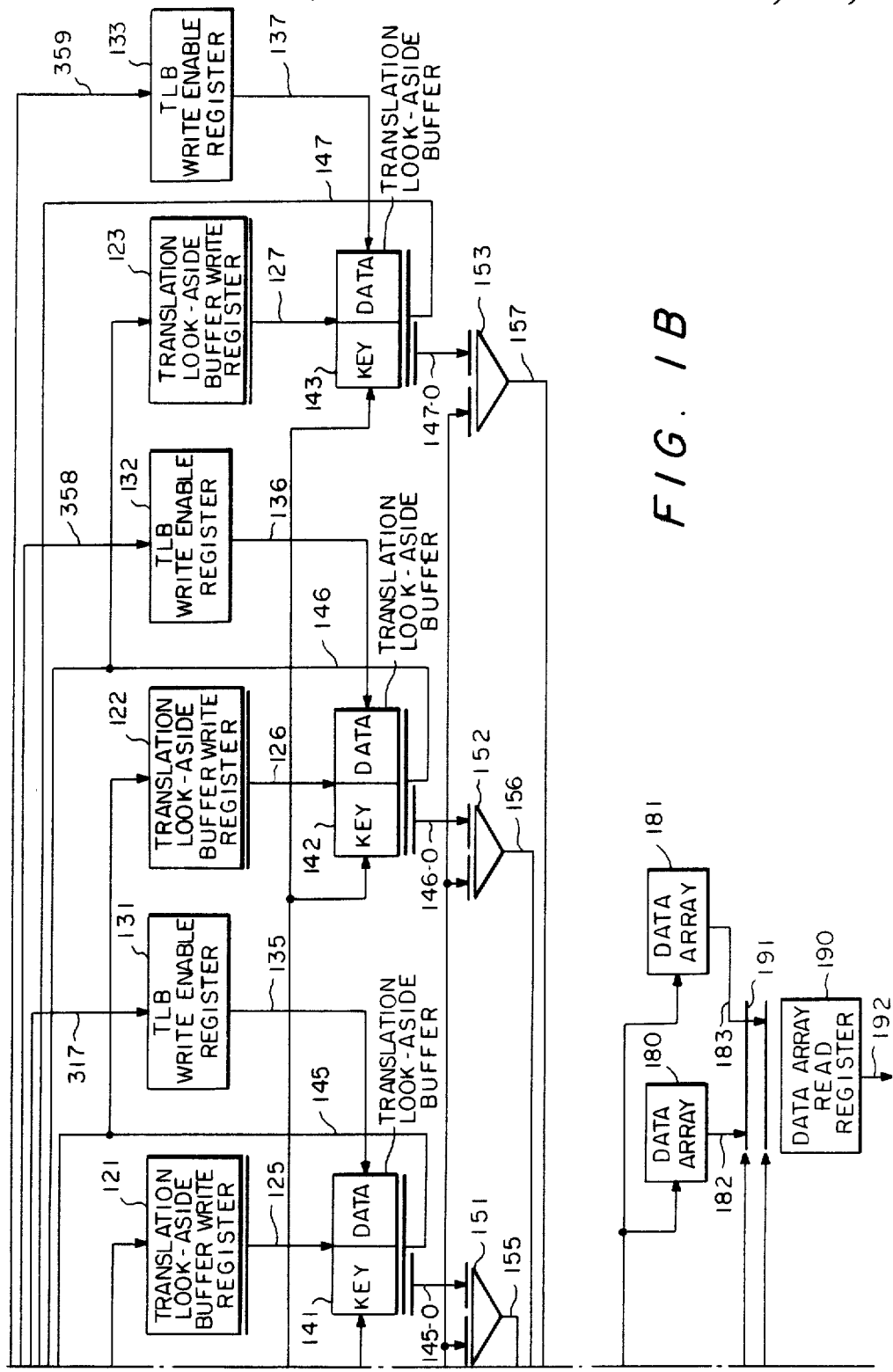

Referring to FIGS. 1A and 1B, a preferred embodiment of the present invention includes a logical address register (LAR) 100. The LAR 100 is intended to hold a logical address sent from a request source, and a logical address to be held by the LAR 100 consists of a segment number (S), a page number (P) and an in-page line address (L). When the logical address is translated into a real address, the segment number (S) and the page number (P) are translated, but the in-page line address (L) remains untranslated and is used for the real address as it is. A logical address buffer register (LABR) 101 is intended for temporary standby of the contents of the LAR 100.

A memory request register (MQR) 110 is intended to hold a memory read request corresponding to the logical address sent from the request source. Upon acceptance of a memory read request by the MQR 110, a series of memory reading actions is started.

A memory request buffer register (MQBR) 111, a buffer intended for temporary standby of the contents of the MQR 110, corresponds to the LARB 101 for logical addresses and is controlled in synchronism with the actions of the LARB 101. Thus, when a logical address stands by in the LARB 101, the corresponding memory read request also stands by in the MQRB 111.

TLB write data registers (TBWR) 120, 121, 122 and 123 are intended to hold information (address translation pairs) to be registered in TLB's 140 to 143.

The TLB's 140, 141, 142 and 143 are buffers for high-speed translation of logical addresses into real addresses. Arranged in a four-level constitution, the TLB's 140, 141, 142 and 143 are assigned the first, second, third and fourth ranks of priority, respectively.

In the TLB's 140 to 143, parts of the segment number (S) and the page number (P) of a logical address are used as a reference address, and the remaining parts of the segment number (S) and the page number (S) are registered as a key address The parts of the logical address constituting this key address and the corresponding real address are registered as a pair. TLB hit detecting comparators 150, 151, 152 and 153 compare a key address section read out of the TLB's 140 to 143 and the key address section of the logical address set in the LAR 100, and determines which of the TLB's 140 to 143 this logical address is registered in.

A real, or physical, address register (PAR) 160 is intended to hold real addresses translated by the TLB's 140 to 143, and the real addresses are always supplied by the TLB 140 alone.

Address arrays (AA's) 170 and 171 are buffers to hold information indicating what locations of data arrays (DA's) 180 and 181 the instruction word and the operand data to be fetched are respectively stored in, and AA's and DA's are arranged in two-level constitutions.

The DA's 180 and 181 are buffers to store instruction words and operand data. A data array read register (DAR) 190 is intended to hold an instruction word and operand data read out of either the DA 180 or the DA 181. As a real address is set in the PAR 160, the AA's 170 and 171 and the DA's 180 and 181 are simultaneously referenced by the lower address section of the PAR 160. The upper address section of the real address, registered in the AA's 170 and 171, is read out and supplied to cache hit detecting comparators 174 and 175, respectively. The cache hit detecting comparators 174 and 175 compare the upper address section of the real address set in the PAR 160 and that of the real address read out of the AA's 170 and 171, and determines which of the DA's 180 and 181 the instruction word or the operand data to be fetched is present in. According to the result of determination, data read out of the DA's 180 and 181 are selected by a selector 190, and set in the DAR 190 to send the applicable instruction word or the operand data to the request source.

A TLB control circuit 200 and a cache control circuit 400 take charge of control over the TLB- and cache-related sections, respectively.

Whereas the process until fetching of the instruction word and the operand data through translation of the logical address into the real address has so far been outlined, actions characteristic of the present invention will be described in detail below.

As a request to fetch an instruction word or operand data is sent from a request source, a logical address is set in the LAR 100 through a signal line 10, and a memory read request is set in the MQR 110 through another signal line 11.

The TLB's 140 to 143 are simultaneously referenced through a signal line 104-1 by the TLB referencing address out of the logical address set in the LAR 100, and the key address section registered in the TLB's 140 to 143 are read out and supplied through signal lines 144-0 to 147-0 to the TLB hit detecting comparators 150 to 153 to be compared with the key address section of the logical address supplied over a signal line 104-0 and set in the LAR 100.

It is now supposed that, at this time, the TLB hit detecting comparator 150 detects identity (or "hits"), so that the required real address is found registered in the TLB 140. The TLB hit detecting comparators 150 to 153 output logical "1" when detecting identity, or logical "0" when detecting non-identity. This result of detection is made known to the TLB control circuit 200 through signal lines 154 to 157. The real address read out of the TLB 140 is supplied to a selector 161, and usually set in the PAR 160 as it is. At the same time, the in-page line address of the logical address set in the LAR 100 through a signal line 104-2 is set in the PAR 160 from the LAR 100, and the real address is made definite therein. According to this read address in the PAR 160, the applicable instruction word of operand data is read out into the DAR 190 by the AA's 170 and 171 and the DA's 180 and 181. At the same time, the presence of the address translation pair to be demanded of the TLB 140 is made known from the TLB control circuit 200 through a signal line 360 to the cache control circuit 400. The request data read out into the DAR 190 is returned through a signal line 192 to the request source, together with a reply instructing the request data to be taken in, sent to the request source through a signal line 450 of the cache control circuit 400.

It is now supposed that the result of comparison by the TLB hit detecting comparators 150 to 153 indicates the absence of the required real address in the TLB 140 and its presence in another TLB, for instance the TLB 142. Then, the TLB control circuit 200, notified of the result of comparison by the TLB hit detecting comparators 150 to 153, gives an instruction to replace the address translation pair, which constitutes the read address translation information and is present in the TLB 142, into the TLB 140. This instruction causes the address translation pairs on the same referencing address in all the TLBs from the TLB 140 having the first rank of priority to the TLB 142 having the currently required real address, i.e. the TLB 140 having the first, the TLB 141 having the second and the TLB 142 having the third rank of priority, to be replaced according to this order of priority. In this case, therefore, the content of the TLB 143 having the fourth rank of priority remains unchanged.

First, the pertinent address translation pairs in the TLB's 140 to 142 are read out at the same time, and that in the TLB 142, which has been hit, is set through a selector 128 into the TBWR 120 as what has been assigned a new first rank of priority. The pertinent address translation pairs in the TLB's 140 and 141 are set into the TBWR's 121 and 122, respectively, and the processing of replacement among the TLB's 140 to 142 is completed by writing the contents of the TBWR's 120 to 122 into the corresponding address positions in the TLB's 140 to 142, respectively.

By this replacement processing, the real address translation information (address translation pair) corresponding to the logical address set in the LAR 100 is registered in the TLB 140, and the required real address is supplied from the TLB 140 to the PAR 160.

Figure 2:
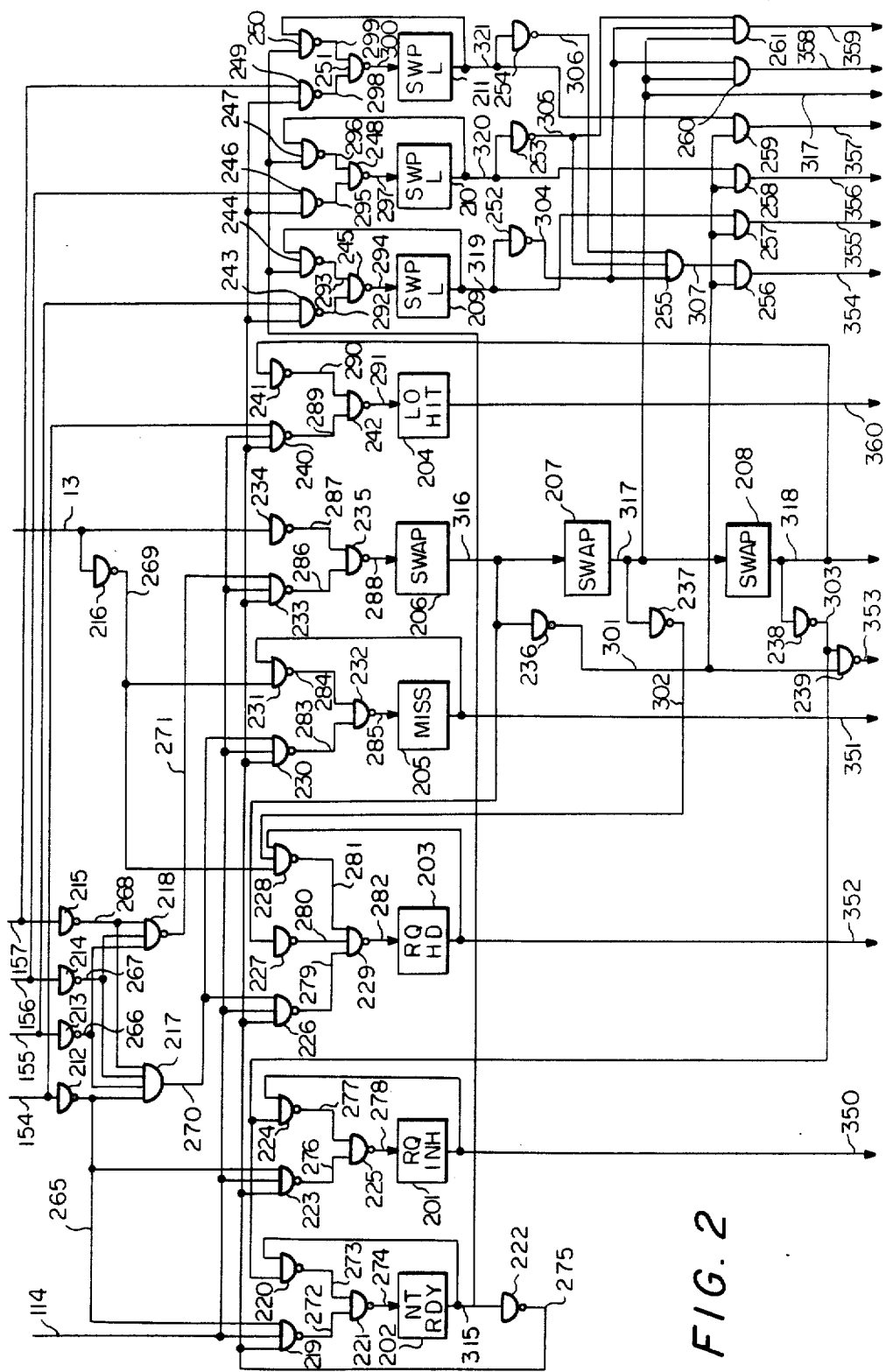
FIG. 2 illustrates the constitution of the TLB control circuit 200 in FIG. 1A.
Figures 3, 5:
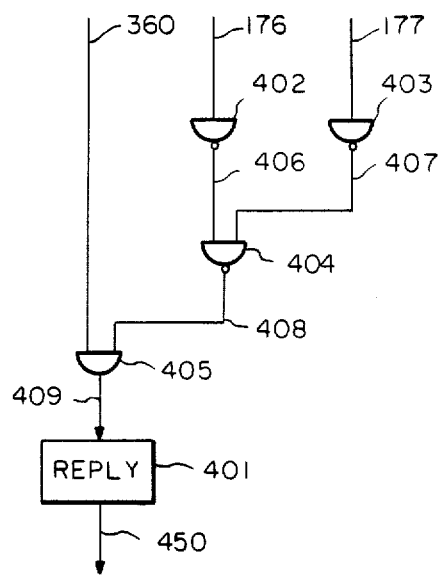
Figure 4:
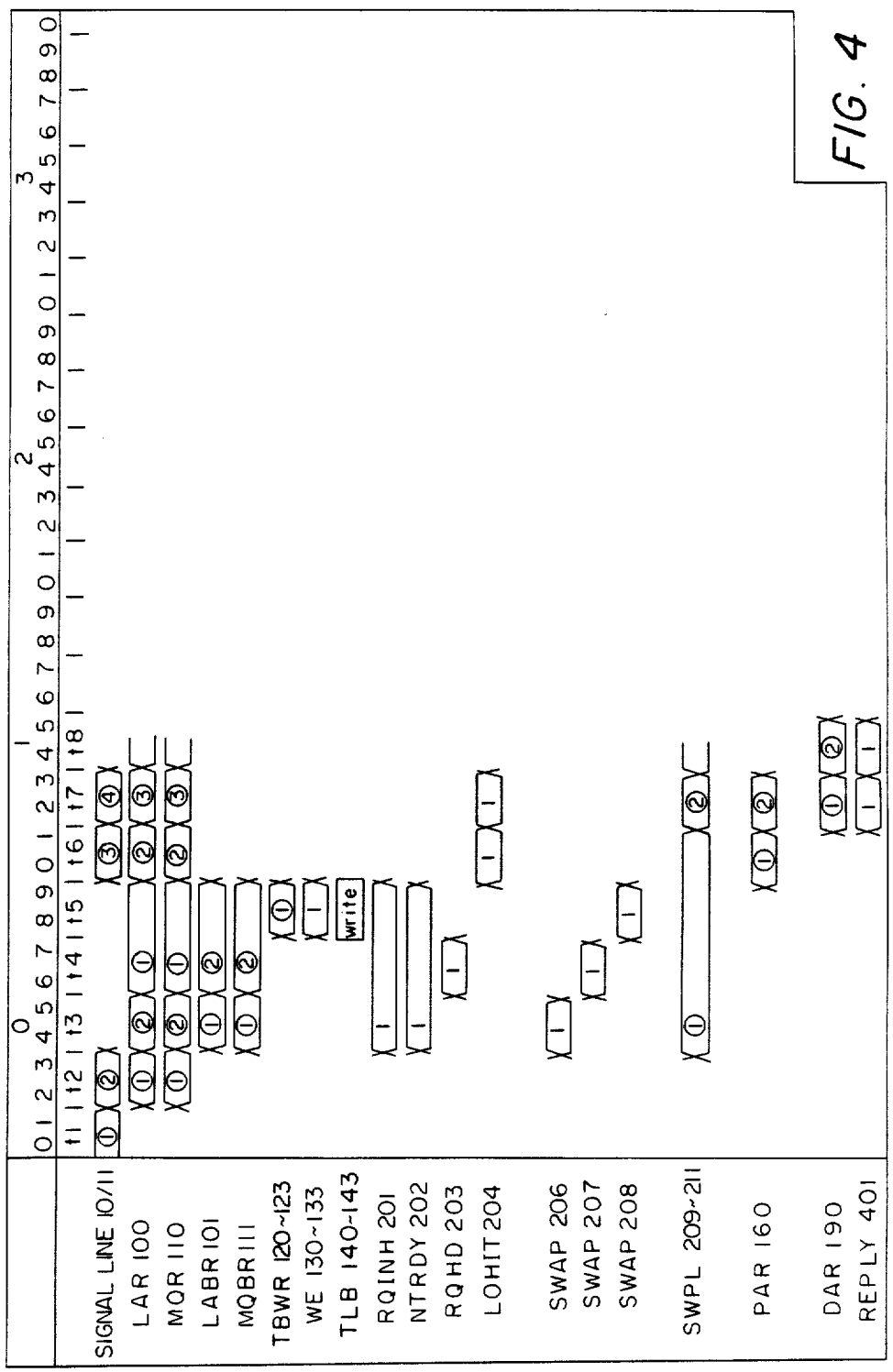

Next, this replacement processing will be described in detail with reference to FIGS. 1A and 1B illustrating the preferred embodiment of the present invention, FIG. 2 illustrating the constitution of the TLB control circuit 200, FIG. 3 illustrating the constitution of the cache control circuit 400, and FIGS. 4 and 5 illustrating the time relationships among different actions.

Referring now to FIG. 4, there is illustrated the action of replacement processing, which is one of the characteristic actions of the present invention and takes place in the absence of the required address translation pair in the TLB 140 and the presence of same in another TLB.

In FIG. 4, ①, ② and ③ denote memory operand read requests, issued from a request source, and their logical addresses.

Referring to FIGS. 1A, 1B, and 4, a memory read request arriving from a request source is accepted through the signal line 11 by the MQR 110, and the corresponding memory read request address is accepted through the signal line 10 by the LAR 100. It is known that a program usually has the memory localization characteristic that, when an instruction word or operand data is accessed, vicinities to the accessed memory area are highly likely to be accessed in succession. TLB's and cache memories are mechanisms utilizing this characteristic. Now, the memory accesses of requests ①, ② and ③ are close to one another on the memory, and the real addresses of requests ①, ② and ③ are on the same page. The page size in this preferred embodiment is 4 KB.

As request ①, provided at timing t1 via the lines 10 and 11, is accepted at timing t2 by the LAR 100 and the MQR 110, the TLB's 140 to 143 are simultaneously referenced through the signal line 104-1. The result of the referencing is made known to the TLB control circuit 200 through the signal lines 154 to 157. The memory read request is made known from the MQR 110 to the TLB control circuit 200 through, a signal line 114.

Referring now to FIGS. 1A, 1B, 2 and 4, a request send inhibit instructing flipflop (RQINH) 201 and a request accept not ready indicating flipflop (NTRDY) 202 are flipflops (FF's) in which logical "1" is set in the absence of the required address translation pair in the TLB 140. An output signal from the RQINH 201 is made known to the request source through a signal line 350, and there is instructed the inhibition of the issue of any new request during this period. Logical "1" in the NTRDY 202 indicates impossibility to reference the TLB's 140 to 143, and the results of referencing the TLB's 140 to 143 are invalidated as long as logical "1" is on. At timing t2, when the NTRDY 202 is at logical "0", the results of referenceing the TLB's 140 to 143 are validated. The results of referencing the TLB's 140 to 143 are set in the RQINH 201, the NTRDY 202, a request hold instructing flipflop (RQHD) 203, a TLB level 0 hit indicating flipflop (LOHIT) 204, a mishit processing indicating flipflop (MISS) 205, a substitution processing control flipflop (SWAP) 206 and substitution level determination control flipflops (SWPL's) 209 to 211. Effective values are set in the RQINH 201, NTRDY 202, RQHD 203, LOHIT 204, MISS 205 and SWAP 206 only when a memory read request is present in the MQR 110, which is set to logical "1" in the presence of a memory read request. In the present case, incidentally, request ① means the absence of the required address translation pair in the TLB 140 and its presence in the TLB 142. Therefore the outputs of the TLB hit detecting comparators 150 to 153, indicating the results of referencing the TLB's 140 to 143, are logical "0", "0", "1" and "0", respectively. As the TLB 140 has been mishit, the RQINH 201 and the NTRDY 202 are set to "1" at timing t3. The SWAP 206 is an FF in which logical "1" is set to start substitution processing in the absence of the required address translation pair in the TLB 140 and in its presence in the TLB's 141 to 143, and is set to logical "1" at timing t3 in the present case. The RQHD 203 and the MISS 205 are FF's in which logical "1" is set in the presence of the required translation pair in every one of the TLB's 140 to 143, and in this case are set to logical "0" at timing t3 as the required address translation pair is present in the TLB 142. The LOHIT 204 is an FF in which logical "1" is set in the presence of the required address translation pair in the TLB 140, and in this case is set to logical "0" at timing t3. In the SWPL's 209 to 211 are set the results of referencing the TLB's 141 to 143 as they are. In the present case, they are set to logical "0", "1" and "0", respectively, at timing 3. Further at timing 3, request ① which has been held in the LAR 100 and the MQR 110 are set in the LABR 101 and the MQBR 111, respectively. A memory read request address and memory read request ②, newly issued from the request source because the RQINH 201 was at logical "0" at timing t2, are set in the LAR 100 and the MQR 110, respectively, at timing t3.

Incidentally, a real address read out of the TLB 140 at timing t2, irrespective of whether or not it is the required one, is set in the PAR 160 at timing t3. Then referencing the caches, i.e. the AA's 170 and 171 and the DA's 180 and 181, is attempted, resulting in the setting of some data or other in the DAR 190 at timing t4. Since, in the present case, the required real address is absent in the TLB 140, the data set in the DAR 190 at this timing t4 cannot be valid. This fact is made known via the signal line 360 to the cache control circuit 400 as the setting of the LOHIT 204 to logical "0" indicates the absence of the required address translation pair in the TLB 140. This signal from the signal line 360 invalidates all the results of cache referencing at timing t3, a reply flipflop (REPLY) 401 indicating the validity of the content of the DAR 190 is set to logical "0" at timing t4, and the invalidity of the content of the DAR 190 is made known via the signal line 450 to the request source.

Now, the logical "1" set in the SWAP 206 at timing t3 is successively set in the SWAP's 207 and 208 at timing t4 and t5, respectively. Logical "1", once set in the RQINH 201 and the NTRDY 202, is held until logical "1" is set in the SWAP 208. As logical "1" is set in the SWAP 208, a logical "0" signal is supplied by a logic inverting gate 238 to NAND gates 224 and 220. After that, output signals from the RQINH 201 and the NTRDY 202 are suppressed, and the RQINH 201 and the NTRDY 202, then at logical "1", are reset to logical "0". Therefore, while the RQINH 201 and the NTRDY 201 are again reset to logical "0" at timing t6, conversely they are held at logical "1" from timing t3 through t5. During this period, the inhibition of the issue of any new request from the request source is instructed, and the results of referencing the TLBs 140 to 143 are invalidated.

The outputs of the SWAPS 206 and 208 undergo OR operation and control selectors 102 and 112 through a signal line 353. The signal line 353 conveys signals to change the choices of the selectors 102 and 112 to the LABR 101 and the MQBR 111, respectively. At timings t4 and t6, requests ① and ② held by the LABR 101 and the MQBR 111, are respectively set in the LAR 100 and the MQR 110. The logical "1" signal from the SWAP 206 turns the content of the RQHD 203 to logical "1". Therefore, the RQHD 203 is set to logical "1" at timing t4. Then the logical "1" signal of the SWAP 207 is inverted to logical "0" by a logical inverting gate 237, and the inverted signal is supplied by way of a signal line 302 to a NAND gate 228, and resets the RQHD 203 to logical "0" through suppression of the output from the RQHD 203. Thus the RQHD 203 is at logical "1" only at timing t4. The output of the RQHD 203 provided by way of a signal line 352 so controls the selectors 102, 103, 112 and 113, respectively controlling the input data of the LAR 100, LABR 101, MQR 110 and MQBR 111, as to select their own outputs, i.e. the outputs of the LAR 100, LABR 101, MQR 110 and MQBR 111, respectively. These registers therefore are held at timings 4 and 5.

The requests ② set in the LAR 100 and MQR 110 are set in the LABR 101 and MQBR 111 at timing 4. The requests ① set in the LABR 101 and MQBR 111 are set in the LAR 100 and the MQR 110. At timing, 4, the contents of the TLB's 140 to 143 are read out again. Next, at the timing 5, the contents of the TLB's 140 to 142 are fixedly stored in the TBWR's 121 to 123, respectively. Then, in response to the output from the SWPL's 209 to 211, the selector 128 selects the desired contents from the. TLB's 140 to 142. The output of the selector 128 is set in the TBWR 120.

The SWPL's 209 to 211 keep information indicating which of the TLB's 141 to 143 the required address translation pair has hit, i.e. is present in, and their outputs are used for controlling the selector 102 and as setting signals for TLB write instruction registers (WE's) 130 to 133. The control signal for the selector 120 is provided via signal lines 354, 355, 356 and 357, which are controlled so that every one of them outputs logical "0" when the SWAP 206 is set to logical "1". Thus, when the logical "1" output of the SWAP 206 is inverted by a logical inverting gate 236 to logical "0", the outputs of the signal lines 354 to 357 supplied to AND gates 256, 257, 258 and 259 are thereby turned to logical "0". This is used when the required address translation pair is present in none of the TLB's 140 to 143, and the address translation to be described below is effected. At any other timing, only one of the outputs of the signal lines 354 to 357 is given as logical "1", and all the others are, as logical "0".

The content of the signal line 354 is used when all of the TLB's 140 to 143 have been mishit, i.e. the required address translation pair is present in none of the TLB's 140 to 143, and holding of the TBWR 120 is then instructed. Thus, if every one of the TLB's 140 to 143 has been mishit, the SWPL's 209 to 211 will be set to logical "0". The logical "0" outputs of the SWPL's 209 to 211 are respectively supplied to logical inverting gates 252 to 254 via signal lines 319 to 321, inverted to logical "1" and supplied to an AND gate 255 via signal lines 304 to 306. Responding to logical "1" provided via every one of signal lines 304 to 306, the AND gate 255 outputs logical "1" by way of a signal line 307 to the AND gate 256, which therefore outputs logical "1" via the signal line 354 except when the SWAP 206 is set to logical "1". In accordance with this logical "1" from the signal line 354, a selector 128 selects the output of the TBWR 120, whose content is again set in the TBWR 120. As a result, the TBWR 120 is held. Details of this operation will be described in more detail afterwards. Incidentally, the contents provided via the other signal lines 355 to 357 are the outputs of the SWPL's 209 to 211, supplied through the AND gates 257 to 259 as they are. Consequently, the outputs of the SWPL's 209 to 211 are supplied as they are to the selector 128 except when the SWAP 206 is set to logical "1".

The selector 128 selects a signal line 145 for conveying the read output of the TLB 141 to set an address translation pair read out of the TLB 141 in the TBWR 120 when the signal line 355 is sending out logical "1", i.e. when the SWPL 209 is set to logical "1". When the signal line 356 is sending out logical "1", i.e. when the SWPL 210 is set to logical "1", the selector 128 selects the content provided by way of a signal line 146 to set an address translation pair read out of the TLB 142 in the TBWR 120. When the signal line 357 is sending out logical "1", i.e. when the SWPL 211 is set to logical "1", the content read out of the TLB 143 is conveyed by way of a signal line 147 and selected, and an address translation pair read out of the TLB 143 is set in the TBWR 120. To sum up, in this series of operations, when the required address translation pair is absent in the TLB 140 having the first rank of priority but is present in one of the other TLB's 141, 142 and 143 having the second, third and fourth ranks of priority, respectively, this address translation pair is registered in the TLB 140 as a new address translation pair having the first rank of priority, and for this purpose, shifting of this address translation pair to the TBWR 120 is processed. As the TBWR's 121, 122 and 123 constitute a new order of priority, address translation pairs are read out of the TLB's 140, 141 and 142 and set in a fixed manner.

The updating of the actual order of priority and replacement processing involve every TLB having a rank of priority between the TLB 140 having the first rank of priority and that one of the TLB's 141 to 143 in which the required address translation pair is present. The contents of the address translation pairs of other TLB's lower in the order of priority are not changed. This procedure will be described below successively with respect to each possible location of the required address translation pair in one of the TLB's 141, 142 and 143. First, if the required address translation pair is in the TLB 141, the address translation pair in this TLB 141 will be shifted to the TLB 140 and vice versa. The contents of the address translation pairs in the other TLB's 142 and 143 will remain unchanged. Then, in the presence of the required address translation pair in the TLB 142, the address translation pair in this TLB 142 will be shifted to the TLB 140, that in the TLB 140, to the TLB 141, and that in the TLB 141, to the TLB 142. The content of the address translation pair in the remaining TLB 143 will remain unchanged.

Finally, in the presence of the required address translation pair in the TLB 143 having the lowest rank of priority, the address translation pair in the TLB 143 will be shifted to the TLB 140, that in the TLB 140, to the TLB 141, that in the TLB 141, to the TLB 142, and that in the TLB 142, to the TLB 143. In this case, all the address translation pairs in the TLB's 140 to 143 are replaced. As may be evident from the foreoging description, the required translation pair is set in the TBWR 120, and in the other TBWR's 121 to 123 are set in a fixed manner the address translation pairs of the TLB's 140 to 142, respectively a rank higher in the order of priority than their own objects of writing in, the TLB's 141 to 143. Actual updating or non-updating can be achieved by controlling the writing into the TLB's 140 to 143 on the basis of the perceived presence of the required address translation pair in one or another of the TLB's 141 to 143. This writing control is accomplished as instructed by the WE's 130 to 133. At the timing of the setting of the WE's 130 to 133 to logical "1", the address translation pairs fixed in the TBWR's 120 to 123 are written into the respectively corresponding TLB's 140 to 143. When the WE's 130 to 133 are set to logical "0", the contents of the corresponding TLB's 140 to 143 remain unchanged. The foregoing description is summed up and tabulated in FIG. 5.

Referring now to FIG. 5, each of the SWPL's 209 to 211 indicates, according to the results of referencing the TLB's 141 to 143, which of the TLB's 141 to 143 the required address translation pair is present in. Thus, the SWPL 209 set to logical "1" indicates the presence of the required address translation pair in the TLB 141. The SWPL 210 set to logical "1" indicates the presence of the required address translation pair in the TLB 142. The SWPL 211 set to logical "1" indicates the presence of the required address translation pair in the TLB 143.

When the SWPL 209 is set to logical "1", the WE's 130 to 133 are set to logical "1", "1", "0" and "0", respectively, at the timing to be stated below. Address translation pairs registered in the TLB's 141 and 140 are respectively shifted to the TLB's 140 and 141 and updated. Similarly, when the SWPL 210 is set to logical "1", the WE's 130 to 133 are set to logical "1", "1", "1" and "0", respectively, and address translation pairs registered in the TLB's 142, 140 and 141 are respectively shifted to the TLB's 140, 141 and 142 and updated. When the SWPL 211 is set to logical "1", the WE's 130 to 133 are set to logical "1", "1", "1" and "1", respectively, and address translation pairs registered in the TLB's 143, 140, 141 and 142 are respectively shifted to the TLB's 140, 141, 142 and 143 and updated.

In FIG. 5, the case in which every one of the SWPL's 209 to 211 is set to logical "0" is cited to describe how the absence of the required address translation pair in all of the TLB's 140 to 143 is processed.

Now note is taken of the state of the address translation pair held in each of the TLB's 140 to 143 having the first to fourth ranks of priority, respectively. Management of the address translation pairs in the TLB's 140 to 143 having these respective ranks of priority is accomplished so as to have the address translation pairs registered in a sequential order beginning with the most recently used and ending with the least recently used. Thus the address translation pairs registered in TLB's 140 to 143 are managed by the most-recently-used (MRU) algorithm. Therefore, to take note of the address translation pair registered in the TLB 143 having the lowest rank of priroity, this pair is placed under management by the least-recently-used (LRU) algorithm.

It has further to be noted that selecting and setting into the TBWR 120 the required address translation pair is controlled with the outputs of the SWPL's 209 to 211. This is one of the problems arising from a difficult aspect of the present invention. In an apparatus operating in a high-speed machine cycle like what the present invention provides for, the selector 120 is directly controlled with signals (contents of the signal lines 154 to 157) obtained by passing the read outputs of the TLB's 140 to 143, each consisting of a memory, through the TLB hit detecting comparators 150 to 153. This is because of the constraint of delay time, and is particularly conspicuous when these signals are handed over from one LSI to another, each constituting a logical function. In this case, the signal lines 155 to 157 are most affected. On the other hand, the FF's 201 to 206 and 209 to 211 in the TLB control circuit 200, which control only one bit each and are actuated by the outputs of the signal lines 154 to 157, permit packaging in positions physically close to the TLB hit detecting comparators 150 to 153 and, unlike the selector 128, need not control many bits. This results in a great advantage in terms of delay time, and operability even in a high-speed machine cycle.

Referring again to FIG. 4, in the TBWR's 120 to 123, the address translation pairs to be replaced in the TLB's 140 to 143 in a new order of priority are fixed at timing t5. In the present case where the required address translation pair is present in the TLB 142, the SWPL's 209 to 211 are set to logical "0", "1" and "0", respectively. Further at timing t4, as the SWAP 206 is set to logical "0", the selector 128 is directly controlled in accordance with the outputs of the SWPL's 209 to 211. As a result, in the TBWR's 120 to 123, the address translation pairs of the TLB's 143, 140, 141 and 142, read out by the logical address of request ① at timing t4, are respectively fixed at timing t5. Then the WE's 130 to 133 are set to logical "1", "1", "1" and "0" in accordance with FIG. 5 at timing t5.

The control over this setting of logical values into the WE's 130 to 133 will be described below. Values according to FIG. 5 in the WE's 130 to 133 are set only for the duration of 1T at the timing of the SWAP 208 being set to logical "1".

Referring to FIG. 5, the WE's 130 and 131 are always set to logical "1" at the aforementioned timing. The WE 132 is set to logical "1" when the SWPL 209 is set to logical "0". The WE 133 is set to logical "1" when both the SWPL's 209 and 210 are set to logical "0". The SWAP's 206 to 208 are FF's whose shifts are so constituted that logical "1" is successively set in response to the actuation of the replacement processing.

Referring again to FIG. 4, the SWAP 206 is set to logical "1" at timing t4 in response to the actuation of the replacement processing, and timings t4 and t5 and their logical "1" are propagated to the SWAP's 207 and 208, respectively. As the SWAP 207 is set to logical "1" at timing t4, the output of the SWAP 207 sets the WE's 130 and 131 at timing t5 directly through a signal line 317. The output of the SWAP 207 is supplied to AND gates 260 and 261 through the signal line 317. Therefore, the AND gates 260 and 261 send out effective outputs only at a timing where logical "1" is set in the SWAP 207. At this time, the AND gate 260 outputs at timing t4 through a signal line 358, and sets in the WE 132, the value supplied to the signal line 304, resulting from the inversion of the output of the SWPL 209 by the logical inverting gate 252. In the present case, as the SWPL 209 is set to logical "0" at timing t4, the WE 132 is set to logical "1" at timing t5. The AND gate 161 outputs at timing t4 through a signal line 359, and sets in the WE 133, the logical product of the values supplied to the signal lines 304 and 305, respectively resulting from the inversion of the outputs of the SWPL's 209 and 210 by the logical inverting gates 252 and 253. In the present case, as the SWPL's 209 and 210 are respectively set to logical "0" and "1" at timing t4, the outputs of the logical inverting gates 252 and 253 are logical "1" and "0", respectively, and the AND gate 261 outputs logical output "0" to set logical "0" in the WE 133 at timing t5.

As a result of the foregoing, at timing t5, the address translation pairs of the TLB's 143, 140, 141 and 142, read out by the referencing addresses of the TLB's 140 to 143 for request ① are set into the TBWR's 120 to 123, respectively, and the WE's 130 to 133 are set to logical "1", "1", "1" and "0", respectively. Then at timing t5, the address translation pairs of the TLB's 142, 140 and 141 are written into the TLB's 140, 141 and 142 in accordance with the new order of priority in the positions corresponding to the referencing addresses of the TLB's 140 to 143 for request ①. At this time, as the WE 133 is set to logical "0", the content of the TLB 143 is not updated. In this way is completed at timing t5 the replacement processing according to FIG. 5. Therefore, since the required address translation pair is fixed in the TLB 140 at timing t5, if the TLB 140 is referenced at timing t6, for example, by request ①, the required real address will be obtained in the PAR 160 at timing t7. In this apparatus, however, in order to achieve faster replacement processing to obtain the real address in the PAR 160, bypass control is accomplished to supply the real address section of the TBWR 120 directly to the PAR 160 simultaneously with the registration of the required address translation pair from the TVWR 120 into the TLB 140. Thus, at timing t5, the real address section in the TBWR 120 is directly supplied to the PAR 160 through a signal line 124-0 simultaneously with its registration in the TLB 140. The output of the SWAP 208 set to logical "1" is sent out to the selector 161 through a signal line 318 at timing t5. The selector 161, when the signal line 318 is sending out logical "1", selects and sets into the PAR 160 the content of the signal line 124-0 and, when the signal line 318 is sending out logical "0", selects and sets into the PAR 160 the content of the signal line 144-1. At the same time, the in-page line address (L) of the logical address of request ① held by the LAR 100 is set into the PAR 160 through the signal line 104-2, and the required real address is fixed in the PAR 160 at timing t6. At this time, simultaneously, the logical "1" output of the SWAP 208 is set into the LOHIT 204 through the signal line 318 at timing t6.

In this manner, exactly the same state as referencing of the TLB 140 by request ① at timing t6, fixing the real address in the PAR 160 at timing t7 and simultaneously setting the LOHIT 204 to logical "1" can be apparently realized at timing t6, 1T earlier. Therefore, in accordance with the real address sought in the PAR 160 at timing 6, the cache memories, i.e. the AA's 170 and 171 and the DA's 180 and 181 are referenced.

Now, in order to simplify description of the parts not directly pertinent to the present invention, it is supposed that the requested data is present in the DA 180 or 181.

First the AA's 170 and 171 and the DA's 180 and 181 are simultaneously referenced through a signal line 162-1 by a cache referencing address out of the logical addresses set in the PAR 160. The registered key address sections are read out of the AA's 170 and 171, and respectively supplied to the cache hit detecting comparators 174 and 175 through signal lines 172 and 173. These comparators 174 and 175 compare the values from the signal lines 172 and 173 with the key address section of the real address set in the PAR 160, supplied from the PAR 160 by way of a signal line 162-0. If identity is detected by the cache hit detecting comparator 174 or 175 (i.e. if either comparator hits), registration of the data demanded by the request source in the DA 180 or 181 will be detected.

The cache hit detecting comparators 174 and 175 will output logical "1" if identity is detected, or logical "0" if non-identity is detected. In this case, therefore, the output of either cache hit detecting comparator 174 or 175, is logical "1". This detection result is made known to the cache control circuit 400 through signal lines 176 and 177 and, at the same time, supplied to the selector 191. Meanwhile, memory data in the positions addressed by the signal line 162-1 are read out of the DA's 180 and 181 and, in accordance with the results of comparison by the cache hit detecting comparators 174 and 175 provided via the signal lines 176 and 177, the memory data demanded by the request source is selected by the selector 191 and set into the DAR 190 at timing t7. At the same time, the logical "1" output of the LOHIT 204, set to logical "1" at timing t6, as made known to the cache control circuit 400 through the signal line 360.

Referring now to FIG. 3, logical inverting gates 402 and 403 and a NAND gate 404 take the logical product of the detection result outputs of the cache hit detecting comparators 174 and 175 made known via the signal lines 176 and 177, and logical "1" is supplied to an AND gate 405 through a signal line 408.

Therefore, as both the signal lines 360 and 408 have conveyed logical "1", the AND gate 405 outputs logical "1" and sets a REPLY 401 to logical "1" at timing t7. The demanded data of request ① read out at this timing t7 to the DAR 190 is sent to the request source through the signal line 192. Simultaneously with this, the logical "1" output of the REPLY 401 is returned through a signal line 450 to the request source as a reply to instruct the demanded data to be taken in.

Incidentally at timing t6, request ② so far held by the LABR 101 and the MOBR 111, is again set into the LAR 100 and the MQR 110 to resume referencing of the TLB's 140 to 143. As request ② is for accessing memory data in the same page as request ①, the real address required by request ② must be present in the TLB 140 having the first rank of priority. Therefore, the outputs of the TLB hit detecting comparators 150 to 153 are logical "1", "0", "0" and "0", respectively, which are made known to the TLB control circuit 200. At timing t7, the control FF's for the RQINH 201, NTRDY 202, RQHD 203, MISS 205 and SWAP 206 are all set to logical "0". The LOHIT 204 is set to logical "1" as the signal line 154 has conveyed logical "1". At the same time, at timing t7, the real address section read ot of the TLB 140 and the in-page line address (L) of the logical address of request ②, held in the LAR 100, are set into the PAR 160 through the signal lines 144-1 and 104-2, respectively. The required real address is fixed in the PAR 160 at timing t7, and the cache memories, i.e. AA's 170 and 180 and the DA's 180 and 181, are referenced. At timing t8, the demanded data of request ② and a reply instructing the demanded data to be taken in are returned to the request source through the signal lines 192 and 450 in succession to the demanded data of request ① and a reply thereto. Meanwhile at timing t6, the RQINH 201 inhibiting the issue of any new request from the request source is reset to logical "0". As a result, another new request ③ is accepted by the LAR 100 and the MQR 110 at timing t7 and, as with request ②, the demanded data is fetched. Together with a reply thereto, the demanded data is returned to the request source through the signal lines 192 and 450 in succession to the demanded data of request ② and a reply thereto.

Once the most recently accessessed address translation pair is thus registered in the TLB 140 having the first rank of priority, the real addresses pertaining to the succeeding requests are more likely than not to be registered on the TLB 140, so that the required real addresses can be quickly supplied from the TLB 140.

If the required real address is absent in the TLB 140 but present in the TLB 141 or 143, exactly the same process will take place. After replacement processing is achieved in accordance with the order of priority among all the TLB's from the TLB 140 to the TLB 141 or 143 as the case may be, the required real addresses can be constantly supplied from the TLB 140.

In this manner the invention dispenses with the process of selecting every time the TLB in which the required real address is registered after judging which TLB that real address is registered in.

Further, as described above, the replacement algorithm following the order of priority among the TLB's 140 to 143 is exactly identical with the LRU algorithm. The address translation pairs registered in the TLB's from the TLB 140 having the first rank of priority to the TLB 143 having the fourth rank of priority are kept being registered in a sequence beginning with the most recently used address and ending with the least recently referenced. Therefore, if the required real address is present in none of the TLB's 140 to 143 and the address translation pair in one or another of the TLB's 140 to 143 has to be rewritten, there will be no need for selection of the rewriting level by a replacement algorithm circuit using an LRU algorithm or the like, and instead the address translation pair of the TLB 143, the lowest in the order of priority, can be always and automatically determined as the object of rewriting.

Next will be described the characteristic operation according to the present invention in the absence of the required address translation pair in any of the TLB's 140 to 143.

Figure 6:
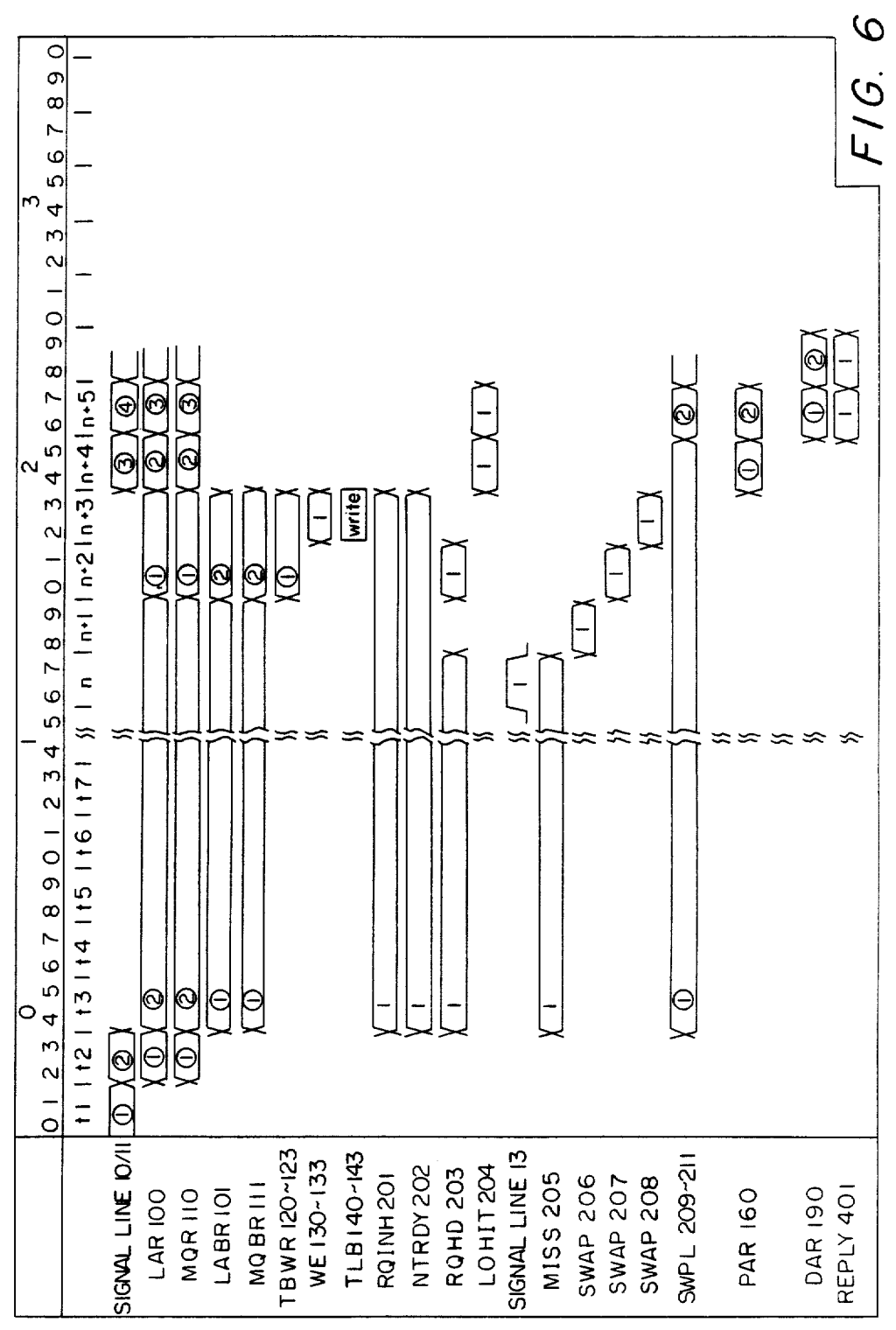

FIG. 6 illustrates the timings of the replacement processing in the absence of the required address translation pair in any of the TLB's 140 to 143.

Circled numerals ①, ② and ③ denote memory operand read requests issued from the request source and the logical addresses thereof.

Referring now to FIGS. 1A, 1B, 2 and 6 together, it is supposed that the address translation pair demanded by request ① is present in none of the TLB's 140 to 143 and that the succeeding requests ② and ③ are to access the same page as request ① did. Thus, once the address translation pair used by request ① is registered in the TLB 140, the address translation pairs demanded by requests ② and ③ will also be registered in the TLB 140. As explained with reference to FIG. 4, the real addresses demanded by requests ② and ③ are quickly supplied from the TLB 140 to the PAR 160. The following description, therefore, will focus on the operation according to request ① in the absence of the required address translation pair in any of the TLB's 140 to 143, and will be kept to the minimum as regards the part in which exactly the same operation control takes place as in the example of FIG. 4.

Like in the example described with reference to FIG. 4, the TLB's 140 to 143 are referenced by request ① at timing t2. The results of detection by the cache hit detecting comparators 150 to 153 are made known to the TLB control circuit 200 through the signal lines 154 to 157. In this case, logical "0" is notified from all the comparators 150 to 153 to the TLB 200 via the lines 154 to 157. At timing t3, the RQINH 201, NTRDY 202, RQHD 203, LOHIT 204, MISS 205, SWAP 206 and SWPL's 209 to 211 are set to the following logical values.

First, as the signal line 154 conveys logical "0", the LOHIT 204 is set to logical "0", in response to which the invalidity of the result of referencing the TLB 140 is made known to the cache control circuit 400 through the signal line 360, and invalidation of the data read out of the DA 180 or the DA 181 to the DAR 190 is instructed. Logical "0" on the signal line 154 is inverted by the logical inverting gate 212, and the resultant logical "1" is set in the RQINH 201 and the NTRDY 202. Then are instructed the inhibition of the issue of any new request from the request source and the invalidation of the results of referencing the TLB's 140 to 143 thereafter until the RQINH 201 and the NTRDY 202 are again reset to logical "0". As all the signal lines 154 to 157 convey logical "0", all these logical values are inverted by the logical inverting gates 212 to 215 and turned into logical "1". These logical "1" values are supplied through signal lines 265 to 268 to an AND gate 217, which, by taking the logical product of all the logical "1" values, outputs logical "1". This logical "1" sets the RQHD 203 and the MISS 205 to logical "1" through a signal line 270. The RQHD 203 instructs at timing t3 holding of the memory read request address and the memory read request for requests ② and ①, held by the LAR 100, MAR 110, LABR 101 and MQBR 111, until it is again reset to logical "0". The memory read request address and the memory read request for request ①, held at timing t2 by the LAR 100 and the MQR 110, are set in the LABR 101 and the MQBR 111, respectively, at timing t3. Since the RQINH 201 remains at logical "0" at timing t2, new request ② is issued from the request source. The memory read request address and the memory read request for request ② are set in the LAR 100 and the MOR 110, respectively, at timing t3.

The MISS 205 is an FF which is set to logical "1" when the required address translation pair is present in none of the TLB's 140 to 143, and the output of this logical "1" instructs through a signal line 351 an address translating circuit (not shown) to execute address translation. This MISS 205 is held at logical "1" until it is again reset by an address translation completion predicting signal from the address translating circuit.

Into the SWAP 206 is set the logical sum of the results of detection by the TLB hit detecting comparators 151, 152 and 153, respectively sent via the signal lines 155, 156 and 157 by logical inverting gates 213, 214 and 215 and a NAND gate 218. Therefore at timing t3 is set logical "0", and no such replacement processing as shown FIG. 4 is actuated. Finally in the SWPL's 209 to 211 are set, as they are, the results of detection by the TLB hit detecting comparators 151, 152 and 153 through the signal lines 155 to 157, and at timing t3 are set all the SWPL's 209 to 211 to logical "0", which is held by the SWPL's 209 to 211 until the TLB's 140 to 143 are newly referenced.

As the above-mentioned logical values are set in the control FF's 201, 202, 203, 204, 205, 206 and 209 to 211 at timing 3, the MISS 205 instructs through the signal line 351 the address translating circuit to execute address translation as stated above. In order to execute address translation of request ① at the same time, the logical address of request ① held by the LABR 101 is supplied to the address translating circuit through a signal 105. In the address translating circuit, address translation into a real address is executed by the logical address of request ① through the signal line 105. Thus, the segment table and the page table stored on the main memory are referenced by the segment number (S) and the page number (P) of the logical address. In response to this reference, the real page number is taken out, and the real address is found out by combining it as a superior real address of the in-page line address (L) of the 12 least significant bits of the logical address.

Since this process of translation from a logical address to a real address is well known to those skilled in the art and has no direct relevance to the present invention, its description will be kept to the necessary minimum.

In the segment table and the page table are respectively stored segment entries and page entires in the orders of the segment number (S) and of the page number (P). In this preferred embodiment, the segment entries and the page entries respectively consist of 8 bytes and 4 bytes each.

First, the leading real address in the segment table, held in a segment base register (not shown), and the eight-fold multiple of the segment number (S) of the logical address held in the LAR 100 are added together to generate the real address of the segment entry denoted by the segment number (S) and to read out the segment entry on that basis.

The leading real address of the page table is taken out from this segment entry, and is added to the fourfold multiple of the page number (P) of the logical address held in the LAR 100 to generate the real address of the page entry denoted by the page number (P) and to read out the page entry.

From this page entry is taken out the real page number, which is the real address of the 20 most significant bits of the 32 bits of the real address, and the translation from the logical address into the real address is thereby completed.

While the above described address translation is being executed in the address translating circuit, queuing for the completion of address translation is taking, place in the TLB control circuit 200. The address translating circuit sends out through a signal line 12 the real page number, obtained by the above described address translation, as the real address for address translation and, in order to make known the sending timing of this real address for address translation, provides an address translation completion predicting signal through a signal line 13.

This address translation completion predicting signal is a timing signal for setting a real address for address translation in an interface register in the address translating circuit in order to send out the real address for address translation, and predicts the completion of address translation with logical "1".

At timing n in FIG. 6, the address translation completion predicting signal is notified from the address translating circuit through the signal line 13 to the TLB control circuit 200. This address translation completion predicting signal is inverted to logical "0" by a logical inverting gate 216, and supplied by way of a signal line 269 and AND gates 228 and 231 to the RQHD 203 and the MISS 205 to suppress their outputs. Therefore, the contents of the RQHD 203 and the MISS 205 are reset to logical "0" at timing n+1. At the same time the address translation completion predicting signal is supplied to the SWAP 206 via the signal line 13 and, in response to this predicting signal, the SWAP 206 is reset to logical "1" at timing n+1.

Here is seen that the timings t3 to t7 in FIG. 4 and timings n+1 to n+5 in FIG. 6 are exactly the same, respectively. Thus the operations at timings n+1 to n+5 of FIG. 6 are controlled in the same way as those at timings t3 to t7 described with reference to FIG. 4. As described above, at timing n+1, 1T later than timing n at which the address translation completion predicting signal is sent out, the real address for address translation is set into the interface register in the address translating circuit and sent out through the signal line 12.

At the timing when the SWAP 206 is set to logical "1", the logical "1" of the SWAP 106 is inverted to logical "0" by the logical inverting gate 236, and supplied to the AND gates 256, 257, 258 and 259. In response to this logical "0", the AND gates 256, 257, 258 and 259 are suppressed to logical "0", and supply their outputs to the selector 128 through the signal lines 354, 355, 356 and 357. The selector 128, when every one of the signal lines 354, 355, 356 and 357 outputs logical "0", selects signal lines 105-0 and 12, whose content is set logical "0" in the TBWR 120. Therefore at timing n+2, the key address section of the logical address of request ①, held by the LABR 101, and the real address for address translation of request ① is set in the TBWR 120 as the address translation pair having a new first rank of priority resulting from the address translation. When every one of the SWPL's 209 to 211 is set to logical "0", the AND gates 256 to 259 respectively output logical "1", "0", "0" and "0" at the timing of the setting of logical "1" into the SWAP 207. These signals are supplied to the selector 128 through the signal lines 354 to 357, and the selector 128 selects the signal line 124 to convey the output of the TBWR 120. The selected content is again set into the TBWR 120 to be held there. Thus at timing n+2, logical "1", "0", "0" and "0" are supplied to the selector 128 through the signal lines 354 to 357, respectively, and the content of the TBWR 120 is held. Accordingly at timing n+3, the address translation pair of request ① obtained by address translation is set into the TBWR 120, and into the other TBWR's 121, 122 and 123 are respectively set the address translation pairs of the TLB's 140, 141 and 142 read out by the referencing addresses of request ① for the TLB's 140 to 143. At the timing when the SWAP 207 is set to logical "1", the SWAP 207 outputs logical "1" to the WE's 130 and 131 directly through the signal line 317. The AND gates 260 and 261, when every one of the SWPL's 209 to 211 is set to logical "0", are validated by the logical "1" output of the SWAP 207, and respectively supply logical "1" to the WE's 132 and 133 through the signal lines 358 and 359. Then at the timing when the SWAP 208 is set to logical "1", every one of the WE's 130 to 133 is set to logical "1". Therefore at timing n+3, the WE's 130 to 133 are all set to logical "1", and the address translation pair of request ① resulting from address translation according to a new order of priority is written into the TLB 140 in a position corresponding to the referencing addresses of request ① for the TLB's 140 to 143. Into the other TLB's 141, 142 and 143 are respectively written the address translation pairs of the TLB's 140, 141 and 142 read out by the referencing addresses of request ① for the TLB's 140 to 143.

Therefore, the foregoing processing automatically rewrites the address translation pair having the lowest rank of priority, registered in the TLB 143, and a TLB replacement algorithm circuit using an LRU algorithm or the like is thereby dispensed with.

The processing of request ① under bypass control from the TBWR 120 and that of the succeeding requests ② and ③ are achieved in exactly the same way as the case described with reference to FIG. 4.

One of the characteristic features of the present invention consists in the simplification of the real address referencing path from the TLB to determine the machine cycle. This characteristic makes it possible to substantially reduce gate delays, resulting in the advantage of shortening the machine cycle of the system.

Another feature of the invention is the dispensation with a TLB replacement algorithm circuit. This features has the advantage of drastically reducing the hardware volume and reducing the overall size of the system.

Still another feature of the invention is the minimized increase of the system's machine cycle, making it possible to increase the capacities and number of TLB's and resulting in a significant improvement of system performance.

What is claimed is:

1. An address translation buffer control system comprising:
   N address translation buffers each storing a plurality of address translation pairs, each pair including a logical address and a corresponding real address, where N is an integer greater than or equal to two, each of said N address translation buffers individually having one of first to Nth ranks of priority for each instruction address and one of first to Nth ranks of priority for each operand address;
   referencing means, connected to said N address translation buffers, for simultaneously searching said N address translation buffers by logical addresses; and
   replacing means, connected to said N address translation buffers, for replacing, in absence of a desired address translation pair in one of said N address translation buffers having a first rank of priority, an address translation pair in said address translation buffer having said first rank of priority with another address translation pair present in an address translation buffer other than said address translation buffer having said first rank of priority.

2. An address translation buffer control system comprising:
   address translation buffers to which first to Nth ranks of priority are assigned and each of which stores a plurality of address translation pairs, each pair comprising a logical address and a corresponding real address, where N is an integer greater than or equal to two;
   referencing means, connected to said address translation buffers, for searching said address translation buffers having first to Nth ranks of priority by logical addresses; and
   replacing means, connected to said address translation buffers, for replacing, in absence of a desired address translation pair in one of said address translation buffers having a first rank of priority when said desired address translation pair is present in another of said address translation buffers having a rank of priority lower than said first rank of priority, contents of every address translation buffer between a first address translation buffer having said first rank of priority to an address translation buffer in which said desired address translation pair is present, in accordance with said ranks of priority, such that an address translation pair in said first address translation buffer having said first rank of priority is replaced with an address translation pair present in another address translation buffer, and replacing, in absence of said desired address translation pair from all of said address translation buffers, an address translation pair in an address translation buffer having a lowest rank of priority.

* * * * *